Aug. 18, 1970     F. SHARP     3,524,753
METHOD OF MAKING A MICROPOROUS FILM
Filed Nov. 24, 1964
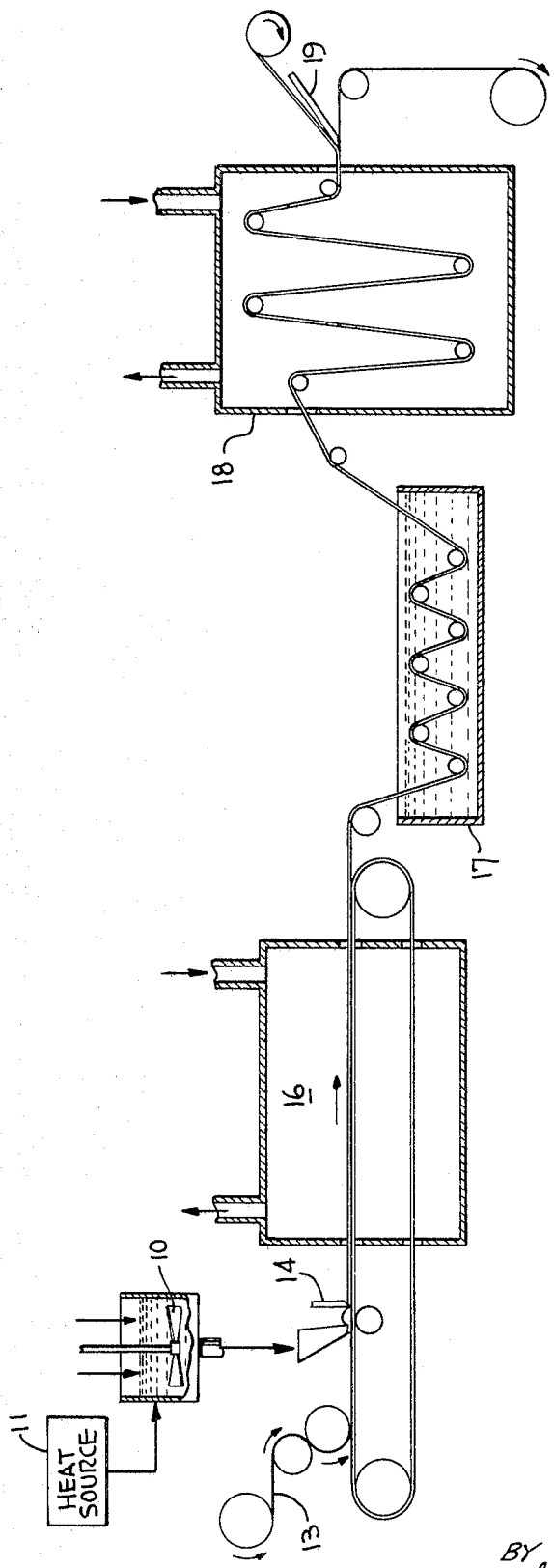
INVENTOR,
FRANK SHARP
BY
Watson, Cole, Grindle & Watson
ATTORNEYS United States Patent Office 3,524,753
Patented Aug. 18, 1970

3,524,753
METHOD OF MAKING A MICROPOROUS FILM
Frank Sharp, Dagenham Dock, England, assignor to Porvair Limited, Dagenham Dock, England, a company of Great Britain
Filed Nov. 24, 1964, Ser. No. 413,597
Claims priority, application Great Britain, Nov. 25, 1963, 46,529/63
Int. Cl. B29d 27/04; B44d 1/09
U.S. Cl. 117—11
10 Claims

ABSTRACT OF THE DISCLOSURE

A process for making a microporous film which comprises dispersing a finely divided salt in a solution of synthetic organic polymer in an organic solvent, coating a support with a film of the solution to which the film adheres, removing the solvent by evaporation, and avoiding encapsulation by using at least about 43% of solvent based on polymer, solvent, and salt.

---

This invention relates to the production of microporous films or diaphragms of polymeric materials, including both synthetic resins and synthetic rubbers. The invention is concerned particularly, but not exclusively, with the production of very thin microporous films or diaphragms of such materials, that is having thicknesses of 0.5 mm. and less down to the order of 0.1 mm., which are highly permeable to the passage of vapours or gases but prevent the transmission of liquids. The invention further embraces the production of both unsupported films or diaphragms, and supported films, that is films in the form of permanent coatings on a supporting or reinforcing material.

The supported films may be permanent coatings on woven materials and find in this case particular uses in the manufacture of weatherproof garments.

According to the present invention a method of making a microporous film includes mixing a polymeric working material with a solid material, which will be called the removable filler, and a quantity of a solvent for the working material sufficient to completely dissolve it and form a spreadable mixture, forming a coating of the mixture in the form of a film on a support, for example by spreading, casting, or spraying, removing the solvent while supporting the film so as to prevent it from substantially contracting in at least one dimension, and leaching out the filler by a liquid which is a solvent for it but not for the working material, and drying the film. Preferably, the film is prevented from substantially contracting either in length or width during the removal of the solvent by resting on a support to which it adheres. The solvent may be removed by evaporation by heating.

Various processes have previously been described or used in which a working material is mixed with a removable particulate filler, the pore-forming material, and a liquid to form a film, the pore-forming material is leached out and the film dried.

In such a process, before immersing the strip in an aqueous bath to leach out the pore-forming material, it is generally necessary to adopt some means of breaking down the encapsulation of the pore-forming particles, so that on the one hand the leaching bath can have access to them in order to remove them, and on the other hand when it has done so there will be not merely closed pores or cavities but fine passages extending from face to face of the sheet. Two main methods of breaking down the encapsulation may be mentioned. In a process such as that described in British Pat. No. 565,022, starch is employed as the pore-forming material and the swelling of the particles of starch caused by the immersion of the material in boiling water is relied upon to break down the encapsulation. In a process such as that described in British Pat. No. 727,679 encapsulation is broken down by doing mechanical work on the strip, for example by passing it between calendering rollers.

The present invention relies on causing the film to shrink a substantial extent while supporting it so as to prevent it from substantially contracting in at least one dimension.

The invention is not dependent on any particular theory of operation but it is believed that the removal of the solvent while the film is constrained so that it cannot contract freely in all directions, serves to break down the partitions or diaphragms by which the pore-forming particles would otherwise tend to be encapsulated. It is thought that such shrinking while under constraint may be regarded as having somewhat the same effect as allowing the film to shrink freely in all directions and then stretching it to its original size in one or more directions, thereby breaking down the encapsulation. Merely constraining the film so that the shrinking in certain directions never substantially occurs clearly results in an extremely simple process.

The removable filler may comprise discrete particles, and will be called the removable particulate filler. Preferably, the removable particulate filler is finely divided.

In the production of microporous films or diaphragms in which the thickness of the film is 0.5 mm. or less, the particle size of the removable particulate filler is preferably not greater than 50 microns, the greater part being of particle size, 10 to 25 microns.

The removable particulate filler may comprise a water soluble inorganic salt, for example sodium chloride or a water soluble organic material, for example a sugar.

The working material may be a natural or synthetic polymeric plastic material, and may comprise for example polymethyl methacrylate, or polystyrene, or nylon, or an olefin copolyer, or a nitrile rubber, or, in the presence of suitable vulcanising agents, a polyvinyl chloride/nitrile rubber blend, or a plasticised polyvinyl chloride, for example one plasticised with polypropylene sebacate.

Alternatively the working material may be a polyurethane.

The amount of solvent for the polymer included in the initial mixture is not critical provided it is sufficient to meet the conditions set forth above, and clearly the amount will vary depending on the nature of the polymer itself and the solvent chosen and on the need to achieve a final mix of spreadable consistency. For example when the mixture includes one part of polyvinyl chloride and two parts of sodium chloride it has been found that one needs to use nine parts of cyclohexanone as the solvent.

For other working materials the ratio may be different. Thus as a further specific example when the mixture includes one part of a polyurethane (Estane 5740X1) and one or two parts of sodium chloride as the removable filler, it has been found that four parts of cyclohexanone as the solvent for the working material provides a suitable workable mix.

If the microporous film is to be produced as an unsupported film or diaphragm, the support on which the mix is spread, which will be called the temporary support, may be such that the film adheres to the support sufficiently for the initial dimensions of the film in length and breadth to be substantially maintained during the solvent removal, and the method then includes stripping the film from the temporary support subsequent to the removal of the solvent.

In one form of the invention the temporary support may be provided by a drum of suitable dimensions. Alternatively it may be provided by a belt, which may be made of stainless steel or paper.

The temporary support may be coated with a suitable release agent to facilitate the initial stripping of the film from it.

Alternatively, if the microporous film is intended to form a permanent coating on a supporting or reinforcing material, which will be called the permanent support, the said permanent support constitutes the support on which the mix is spread.

It will be appreciated that if the nature of the permanent support is such that it will not resist shrinkage of the applied coating in the direction of its major dimensions, the support will be suitably constrained while the solvent is evaporating so that the coating will be permitted to shrink only in the direction of its thickness.

The permanent support may be a material derived from fibres, which may be natural or synthetic or a mixture thereof. Alternatively, the permanent support may be a plastic material, for example a synthetic plastics material, which may be porous.

The permanent support may be previously shaped to any desired configuration.

One application of the invention is to the manufacture of waterproof or water repellant, but vapour permeable, material for use in the manufacture of weatherproof garments. In this form of the invention the permanent support may be a woven textile material.

Any conventional textile material normally used to make such garments may be used as the permanent support but woven textile materials comprising nylon, Terylene, cotton, or rayon fibres, or mixtures thereof are preferred.

Preferably, when the coated permanent support is intended for use in the manufacture of such weatherproof garments, for example raincoats, jackets or trousers, the textile material is coated with the film on the surface which will be the inner surface of the garment. As described in greater detail later in the specification the water repellancy of the film of working material may be increased by incorporating suitable surface active agents in the initial mixture.

In addition it will be appreciated that garments incorporating coated textile materials made in accordance with the present invention may have the textile surface treated with conventional waterproofing agents by conventional processes.

The permanent support may also be a knitted material or a nonwoven material, for example a felt or a paper material.

In another form of the present invention, as mentioned briefly above in connection with weatherproof garments, the mixture including the base or surface working material may also include a surface active agent. The surface active agent should generally be capable of withstanding the working conditions and the working temperatures and pressures involved without undergoing any substantial chemical degradation. It may thus be insoluble in water.

The surface active agent may affect the ability of the porous working material to become wetted by liquids, either being a wetting agent to render it hydrophilic or wettable, or a proofing agent to render it hydrophobic or water repellant.

Where the agent is relied on to modify wettability it will of course be necessary that a sufficient amount of the agent should remain in the finished material.

The wetting agent may comprise the sodium salts of the bis(alkyl) sulphosuccinates, such as those in which the alkyl groups are the isobutyl, methylamyl, octyl, nonyl or tridecyl groups.

Examples of suitable wetting agents are the proprietary materials sold under the name Manoxol, such as Manoxol IB, MA, OT, N or TR.

The invention is thus applicable to the production of hydrophobic microporous sheet material for various purposes, for example material for use in the manufacture of weatherproof garments. The proofing agent may comprise a long chain polymer of dialkyl or aryl alkyl siloxane units, for example, a silicone resin. A particular example of a suitable proofing agent is the proprietary material sold under the name Silicone M492 which is a white spirit solution containing a silicone resin (approximately 50% by weight of solids). Another suitable proofing agent is the proprietary material sold under the name Silicone R205.

Conveniently the surface active agent is mixed with the solvent which may be a solvent for the surface active agent, so as to be distributed throughout the mixture.

The invention provides a process for the production of microporous films which is simple and convenient to carry out, and which nevertheless is also suitable for use with a wide range of polymeric materials. By means of the invention it is possible to produce films having a water vapour permeability of at least 2500 gms. $H_2O$/sq.meter/ 24 hours and exhibiting a Suter hydrostatic pressure of at least 15 ins. $H_2O$. The invention also enables films to be produced which, even in thicknesses of the order of 0.1 mm., are dimensionally stable with adequate structural strength.

The invention may be put into practice in various ways but certain specific embodiments will be described by way of example with reference to the accompanying diagrammatic drawing.

Examples 1 to 9 relate to the production of an unsupported microporous film or diaphragm.

Example 10 relates to the production of a material incorporating a microporous film in the form of a coating on a woven supporting material, such a material being suitable for use as a water repellant or waterproof vapour permeable material for use among other uses in the manufacture of weatherproof protective garments.

UNSUPPORTED MICROPOROUS FILMS

In each of Examples 1 to 9 the polymeric working material, a solvent therefor, and a water-soluble removable particulate filler are mixed together with the aid of mixing rolls, paint mills, or other suitable means 10. If the particular use to which the film is to be put should make it desirable for the film either to have water repellant or water absorptive properties a suitable surface active agent as described above, for example Silicone M492 or Manoxol N, may be incorporated in this initial mixture, for example 3 parts per 100 parts of working material.

Heat is supplied 11 if it is desired to quicken the solution of the working material in the solvent. The amount of solvent used is at least that sufficient for the working material to pass completely into solution and for the filler to be dispersed therein. This amount is increased as necessary in order to obtain in the final mix a spreadable consistency, such as that of ordinary paint. The mix is then spread on a travelling belt 13 in the form of a thin film for example by a doctor knife 14 its actual depth depending on the desired thickness of the final film, and having regard to the shrinkage which occurs subsequently in the process. The belt with the film on it is next passed through an oven 16 maintained at a suitably elevated temperature, such as 100° C., which causes the solvent to evaporate off and results in a relatively considerable shrinkage in the dimensions of the film. Due to adherence between the film and the belt the shrinkage which actually occurs is confined to its thickness or depth, there being substantially no shrinkage in the length or breadth of the film. The film is then passed through water in a leaching tank 17 maintained at a temperature of, say 50° C., which leaches or dissolves out the pore-forming substance. The resulting microporous film is then dried in an oven 18 at a temperature of about 60° C., the actual temperature depending upon the nature of the polymeric working material.

In the production of an unbacked microporous film, the film has to be stripped from the travelling belt by a stripper blade 19. In this case the belt 13 conveniently comprises either a stainless steel belt or a band of paper, to which the film will adhere sufficiently to prevent any lateral or longitudinal shrinkage during the evaporation of the solvent. Whichever material is used it is desirable for the band to have been treated with a suitable release agent, such as a silicone, to enable the film to be removed eventually without damage.

Specific examples will now be given of suitable mixes and the properties of the final films which were formed when using the process described in general terms above. In the first eight examples the working material is stated first, followed by the filler and then by the solvent for the working material. The quantities of these materials which are set forth refer to parts by weight, and the particle size of the filler was never greater than 50 microns, with the greater part thereof being of particle size 10 to 25 microns. The water vapour transmission (vapour permeability) was measured at 38° C. with a dry atmosphere on one side of the film and a relative humidity of 90% on the other side, the said transmission being stated in gms./sq. meter/24 hours. The pore size was measured by the methods set forth in B.S.S. No. 1752.

EXAMPLE 1

Polyurethane rubber (Estane 5740X1)—100
Sodium chloride—100
Cyclohexanone—400
Spread film thickness—0.9 mm.
    Final film thickness—0.17 mm.
    Water vapour transmission—5200
    Pore size—4.8 microns

EXAMPLE 2

Polyurethane rubber (Estane 5740X1)—100
Sodium chloride—200
Cyclohexanone—400
Spread film thickness—0.4 mm.
    Final film thickness—0.12 mm.
    Water vapour transmission—10800
    Pore size—2.4 microns

EXAMPLE 3

Polyvinyl chloride—100
Sodium chloride—200
Cyclohexanone—900
Spread film thickness—0.50 mm.
    Final film thickness—0.12 mm.
    Water vapour transmission—9340
    Pore size—2.4 microns

EXAMPLE 4

Polymethyl methacrylate—100
Sodium chloride—200
Methyl ethyl ketone—230
Spread film thickness—0.60 mm.
    Final film thickness—0.25 mm.
    Water vapour transmission—5800
    Pore size—1.1 microns

EXAMPLE 5

Polystyrene—100
Sodium chloride—200
Toluene—400
Spread film thickness—0.75 mm.
    Final film thickness—0.25 mm.
    Water vapour transmission—4600
    Pore size—1.2 microns

EXAMPLE 6

Nylon 66—100
Sodium chloride—200
Mixed solvent
2 parts phenol by weight—400
1 part methanol by weight—400
Spread film thickness—0.75 mm.
    Final film thickness—0.12 mm.
    Water vapour transmission—9280
    Pore size—1.7 microns

EXAMPLE 7

Olefin copolymer (Zetafin 35)—100
Sodium chloride—200
Xylene—400
Spread film thickness—0.90 mm.
    Final film thickness—0.2 mm.
    Water vapour transmission—3500
    Pore size—1.2 microns

EXAMPLE 8

Nitrile rubber—100
Sodium chloride—200
Cyclohexanone—400
Spread film thickness—0.50 mm.
    Final film thickness—0.15 mm.
    Water vapour transmission—7560
    Pore size—1.6 microns The process of the present invention is also adaptable to the processing of a blend of nitrile rubber and p.v.c., in this case suitable permanent fillers and vulcanising agents being incorporated in the initial mix, as illustrated in the following example:

EXAMPLE 9

Polyvinyl chloride/nitrile rubber blend—100
Sodium chloride—300
Cyclohexanone—400
Zinc oxide—5
Sulphur—2
Accelerators ("Vulcafor BA" and "Vulcafor ZDC")—1.5
Spread film thickness—0.70 mm.
    Final film thickness—0.2 mm.
    Water vapour transmission—7400
    Pore size—1.8 microns The microporous films described in the above examples all exhibited a Suter hydrostatic pressure of from 15 to 80 ins. H$_2$O, and at atmospheric pressure provided a very efficient barrier to the penetration of water and most aqueous solutions.

Such films or diaphragms are particularly suitable for use as very fine filters for the removal of particulate matter from gases and liquids, in the case of the latter, the liquids being supplied under pressure or the diaphragm being treated with a suitable wetting agent, as described above, as necessary in order to overcome the resistance to liquid penetration.

The use of sufficiently large amounts of solvent to ensure that the working material goes completely into solution and to obtain a spreadable paint-like consistency in the final mix, entails a large "dilution" of the working material so that, when the solvent evaporates off, in practice at least two-thirds and often as much as four-fifths of the original working material/solvent bulk is removed. This accounts for the considerable shrinkage which occurs in the depth of the film, its initial thickness as spread being reduced by as much as 80% thereof in some cases as can be seen from the above examples. In order to achieve this result the amount of solvent should be at least about 43% by weight of the mixture of working material, solvent, and filler as indicated in the foregoing examples.

The large dilution of the polymer is of course necessary if the process is to remain simple, and to be workable insofar as the spreading of a homogeneous film is concerned, but it does result in the particles of the removable filler being relatively widely dispersed in the film as initially spread, which means in turn that such particles are likely to be completely encapsulated, such encapsulation occurring to a considerable extent throughout the spread film. Due to these problems of wide dispersion and encapsulation, it had not been expected heretofore, when using a removable particulate filler, that such a simple solution process as that of the present invention could be used successfully in the production of a completely effective microporous material. However the shrinkage which subsequently occurs, and which is deliberately confined to one direction only whereby its effect becomes greater in that direction, is believed to result in the exertion of considerable mechanical work on the individual elements, in the form of filaments or partitions or diaphragms, of the working material which remain following the removal of the solvent, and any partitions or diaphragms which might have been completely encapsulating the removable filler particles are effectively ruptured. Thus, at the leaching step, the removable filler particles may be completely removed from the film to produce in the final product a wholly intercommunicating system of voids or pores.

It will be appreciated that the scope of the invention is not limited to the use of the particular polymeric materials mentioned previously or set forth in the above specific examples. Any synthetic polymeric plastic material, for example a synthetic resin or a synthetic rubber, may be employed and is suitable for the process according to the invention provided it is capable of forming a continuous and homogeneous film from a solution of it in a slvent. It is preferred that the ability to form such a film should be present at ordinary or room temperatures. Thus, if higher temperatures have to be employed in order to carry out the spreading operation, loss of solvent is likely to occur prior to the spreading of the film being complete, this in turn affecting the uniformity of the spread film and the relative amount of shrinkage subsequently desirable in order to achieve the required effective microporosity.

SUPPORTED MICROPOROUS FILMS

These may conveniently be made by utilising the mixtures described for Examples 1 to 9. In the case of the production of materials which are water repellant but vapour permeable and are intended for use in the manufacture of weatherproof garments, which are required to be flexible, the initial mixtures of Examples 1, 2, 7, 8 and 9 are suitable and preferably also include 3 parts by weight of a proofing agent Silicone M492.

The method described in relation to Examples 1 to 9 may also be used with the modification that the permanent support, for example a woven textile material whereon in effect the film is to provide a microporous coating, is itself utilised as the belt on which the mixture is initially spread and to which it adheres, the adhesion in this case being intended to be permanent.

EXAMPLE 10

The mixture of Examples 1, 2, 7, 8 or 9 incorporating 3 parts of Silicone M492 are spread on a woven nylon fabric on the surface which will be used as the interior of any garment which may be made from the material.

The method of the appropriate example is then carried out.

The woven textile surface of the material may subsequently be treated with conventional proofing agents if desired to give the outer surface of the garment conventional waterproof appearance and properties.

As is evident from the foregoing description and the above specific examples, the process of the present invention affords a particularly simple and convenient method of manufacturing microporous films or diaphragms in a wide range of polymeric plastic materials, comprising both synthetic resins and synthetic rubbers, which films may be produced in thicknesses down to the order of 0.1 mm. while being at the same time highly permeable to vapours and gases but resistant to the penetration of water and most aqueous solutions. These last properties make such films or diaphragms, in the form of microporous coatings on fabrics and the like, particularly useful in the field of weatherproof protective clothing.

What I claim as my invention and desire to secure by Letters Patent is:

1. A method of making a microporous film which includes forming a spreadable mixture of a synthetic soluble polymeric plastic working material, a finely divided removable filler, and a solvent for the working material, coating a support with a film of the mixture, removing the solvent by evaporation, leaching out the filler from said soluble polymeric material with a liquid which is a solvent for the filler but not for the working material, and drying the film; the amount and nature of the solvent being selected for the particular working material so that the working material is completely dissolved in the solvent and the mixture is a homogeneous suspension of a solid phase, the removable filler, in a liquid phase, the solution of the working material in the solvent; the amount of solvent is at least about 43% by weight of the total amount of solvent, filler, and working material in the initial mixture; the ratio of filler to working material is at least 1 to 1 in parts by weight; the particle size of the removable filler is not greater than 50 microns; and the film adhering to the support and thereby being prevented from substantially contracting in length and breadth while being allowed to shrink in thickness to avoid encapsulation of the removable filler.

2. A method as claimed in claim 1 in which the working material comprises a thermoplastic elastomeric polyurethane.

3. A method as claimed in claim 1 in which the working material is selected from the group consisting of polyvinyl chloride, polymethyl methacrylate, polystyrene, polyamides, olefin copolymers, nitrile rubbers, polyvinyl chloride/nitrile rubber blends in the presence of suitable vulcanizing agents, plasticized polyvinyl chloride and blends of these materials.

4. A method as claimed in claim 1 in which the thickness of the film is between 0.12 millimeter and 0.25 millimeter, and the greater part of the removable filler has a particle size of 10 to 25 microns.

5. A method as claimed in claim 1 in which the shrinkage in thickness is at least 58%.

6. A method as claimed in claim 1 in which the microporous film to be produced as an unsupported film, the mix being spread on a temporary support to which the film adheres sufficiently for the initial dimensions of the film in length and breadth to be substantially maintained during the solvent removal, and the film being stripped from the temporary support subsequent to the removal of the solvent.

7. A method as claimed in claim 1 in which the thickness of the film is 0.5 mm. or less, and the particle size of the removable solid filler is not greater than 50 microns, the greater part being of particle size, 10 to 25 microns.

8. A method as claimed in claim 7 in which the mixture includes one part of polyvinyl chloride and two parts of sodium chloride and nine parts of cyclohexanone as the solvent.

9. A method as claimed in claim 7 in which the mixture includes one part of a polyurethane, from one to two parts of sodium chloride as the removable filler, and four parts of cyclohexanone as the solvent for the working material.

10. A method of coating a woven nylon fabric with a microporous film of a polyurethane which comprises forming a solution of 100 parts by weight of the said polyurethane in 400 parts by weight of cyclohexanone, dispersing through the said solution between 100 and 200 parts of sodium chloride ground so as to have all particles of size less than 50 microns, the greater part being of size 10 to 25 microns, coating the said woven nylon fabric with the solution, evaporating off the said cyclohexanone at an elevated temperature, leaching out the said salt with water and drying the said fabric with the microporous polyurethane film attached to it.

References Cited

UNITED STATES PATENTS

| | | | |
|---|---|---|---|
| 2,542,527 | 2/1951 | Honey et al. | 264—49 |
| 2,707,201 | 4/1955 | Fernald et al. | 264—49 XR |
| 2,810,932 | 10/1957 | Honey et al. | 264—49 |
| 2,953,622 | 9/1960 | Gray | 136—146 XR |
| 3,035,110 | 5/1962 | Corren | 136—146 XR |
| 2,665,450 | 1/1954 | Lindquist | 264—49 |
| 2,712,154 | 7/1955 | Lindquist | 264—49 XR |
| 2,984,869 | 5/1961 | Honey et al. | 264—49 |
| 3,266,966 | 8/1966 | Patchell | 264—49 XR |

PHILIP E. ANDERSON, Primary Examiner

U.S. Cl. X.R.

117—63, 161; 161—159; 260—2.5; 264—49, 216, 299